(No Model.)

A. P. BROWN.
TOY.

No. 329,269. Patented Oct. 27, 1885.

Witnesses:
C. Hall.
C. E. Sundgren

Inventor:
A. P. Brown

ADDISON P. BROWN, OF NEW YORK, N. Y.

TOY.

SPECIFICATION forming part of Letters Patent No. 329,269, dated October 27, 1885.

Application filed September 15, 1884. Serial No. 143,059. (No model.)

*To all whom it may concern:*

Be it known that I, ADDISON P. BROWN, of the city and county of New York, in the State of New York, have invented a new and Improved Toy, of which the following is a specification.

My invention consists in the combination, with a supporting-frame, of a number or series of wheels of different sizes, pivoted to or mounted upon said frame and gearing with one another, and having delineated or formed on their surfaces a figure which is complete when the wheels are brought to certain relative positions. For example, supposing a series of six wheels are arranged in circular form and pivoted to or mounted upon a frame, and that upon the surfaces of the wheels is delineated or formed a large circle, each wheel of the series bearing upon it an arc of that circle, when the wheels are brought to the exact relative positions which they occupied at the time of making or delineating the circle, the several arcs on the wheels will join at their ends and the circle will be complete; but as soon as the wheels are turned the continuity of the figure will be destroyed, and the wheels, owing to their various sizes, must be turned for a time, varying according to the number of wheels, before they will be brought to their original relative positions and the continuity of the figure restored.

Figure 1:
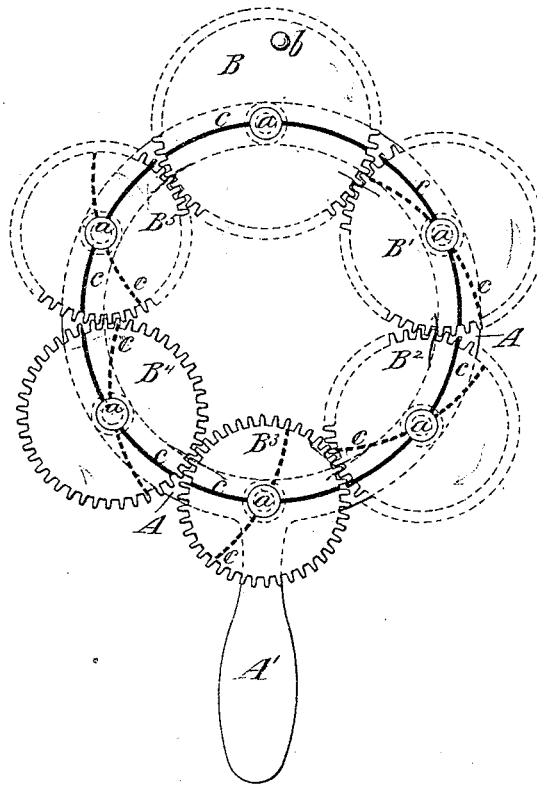
Figure 2:
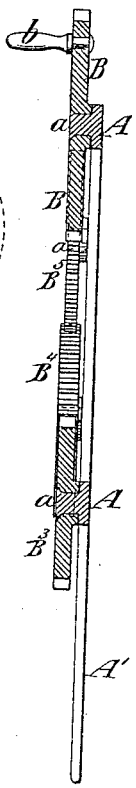

In the accompanying drawings, Figure 1 represents a face view of my improved toy, and Fig. 2 is a sectional view thereof.

Similar letters of reference designate corresponding parts in both figures.

A represents the frame, which may be of cast metal, and is provided with a handle, A', whereby it may be held.

B B' B² B³ B⁴ B⁵ designate a series of wheels, which, as here shown, are mounted on pivots $a$ upon the frame, and which are of various sizes. One wheel—in this instance the wheel B—is provided with a handle, $b$, whereby it may be turned, and as the several wheels are geared together the wheel B will, when turned, drive the whole series. Adjacent wheels which engage with each other will always turn in opposite directions, and when the number of wheels is even the first wheel, B, of the series may gear into the last wheel, B⁵, as here shown, because said two wheels can turn in opposite directions; but when the number of wheels is odd, the first and last wheels cannot gear together, because they both tend to turn in the same direction, and would therefore lock the whole series of wheels against turning. On the surfaces of the series of wheels is delineated any suitable figure which is complete only as to all the wheels, and a portion of which is upon each wheel. I have shown a circle, $c$, of which each wheel bears an arc, and which is continuous only when the wheels are in the relative positions shown in the drawings. The continuity of the circle is destroyed as soon as the wheels are turned, and as some move or rotate faster than others, owing to their different sizes, the turning must be continued for a sufficient time before they will be restored to their original relative positions and the continuity of the circle $c$ established.

In the drawings I have represented by dotted lines the positions which the arcs on the several wheels will occupy after the wheel B has been rotated a complete turn. It is obvious that if the wheels were all of the same size they would make their rotations synchronously and the circular figure would be restored at each turn; but owing to their different sizes their periods of rotation will be varied, and hence they may be turned for a long time without restoring the circular figure $c$.

The toy may be sold with the wheels turned so as to destroy the continuity of the circular figure, and the puzzle or problem consists in turning them until the continuity of the figure is restored. It is of course necessary that the wheels should not be removed from their pivots, and to prevent this the pivots $a$ may be cast on the frame A, and after the wheels are placed thereon may be slightly riveted or upset and marked with a private punch.

The wheels may be varied in number, as desired, and may be set in any form, so long as they are all geared together. The wheels might, for example, be set in the form of a triangle or in curved lines, and the figure drawn on them may represent any mathematical figure or natural object.

What I claim as my invention, and desire to secure by Letters Patent, is—

The combination, with a supporting-frame, of a number or series of wheels of different sizes, pivoted to said frame and gearing one with another, and having delineated or formed on their surfaces a figure which is complete only when the wheels occupy certain relative positions each with the others, substantially as and for the purpose herein described.

A. P. BROWN.

Witnesses:
C. HALL,
F. HAYNES.